United States Patent
Huang et al.

(10) Patent No.: US 10,635,436 B2
(45) Date of Patent: Apr. 28, 2020

(54) COMPATIBILITY METHOD BASED ON HYBRID, ADAPTER, OPERATION DEVICE, SYSTEM AND COMPUTER-READABLE STORAGE MEDIUM

(71) Applicant: Ping An Technology (Shenzhen) Co., Ltd., Shenzhen, Guangdong (CN)

(72) Inventors: Zhijun Huang, Guangdong (CN); Chunjiang Li, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/097,831

(22) PCT Filed: Jun. 29, 2017

(86) PCT No.: PCT/CN2017/090919
§ 371 (c)(1),
(2) Date: Oct. 30, 2018

(87) PCT Pub. No.: WO2018/166107
PCT Pub. Date: Sep. 20, 2018

(65) Prior Publication Data
US 2019/0095200 A1 Mar. 28, 2019

(30) Foreign Application Priority Data
Mar. 14, 2017 (CN) .......................... 2017 1 0155069

(51) Int. Cl.
*G06F 8/76* (2018.01)
*G06F 8/71* (2018.01)

(52) U.S. Cl.
CPC . *G06F 8/76* (2013.01); *G06F 8/71* (2013.01)

(58) Field of Classification Search
None
See application file for complete search history.

(56) References Cited

U.S. PATENT DOCUMENTS 9,047,404 B1 * 6/2015 Jibaly .................. G06F 11/362
9,069,375 B2 * 6/2015 Padmavilasom ... H04L 67/2823
(Continued)

FOREIGN PATENT DOCUMENTS

TW 201346585 A 11/2013

OTHER PUBLICATIONS

Yan, Qiao, et al. "Research on the Development Technology of Cross Platform Hybrid Mobile Application Based on HTML5." 2016 International Conference on Communications, Information Management and Network Security. Atlantis Press, 2016. (Year: 2016).*

(Continued)

*Primary Examiner* — Matthew J Brophy

(57) ABSTRACT

Disclosed are a compatibility method based on Hybrid, an adapter, an operation device, a system and a computer-readable storage medium, wherein, the method comprises: a JS adaptation component acquires a second component data from a JS component of a second Hybrid; the JS adaptation component encapsulates the second component data as a parameter data packet applicable for the first Hybrid; the JS adaptation component transmits a first component data to a bridge module of the first Hybrid; the native adaptation component acquires the parameter data packet from the bridge module; the native adaptation component parses the parameter data packet to acquire the class name and the method name; the native adaptation component invokes an interface of the native component of the corresponding second Hybrid according to the class name and the method name and according to a preset calling rule.

13 Claims, 5 Drawing Sheets

(56) References Cited

U.S. PATENT DOCUMENTS

| | | | |
|---|---|---|---|
| 9,471,303 B2* | 10/2016 | Zhou | G06F 8/71 |
| 9,563,449 B2* | 2/2017 | Burckart | G06F 9/45529 |
| 9,733,926 B1* | 8/2017 | Jibaly | G06F 11/362 |
| 9,848,032 B2* | 12/2017 | Staudinger | G06F 9/45529 |
| 9,851,968 B2* | 12/2017 | Straub | G06F 8/71 |
| 9,858,174 B2* | 1/2018 | Straub | G06F 11/3684 |
| 9,886,272 B1* | 2/2018 | Zhou | G06F 8/76 |
| 9,959,100 B2* | 5/2018 | Straub | G06F 8/36 |
| 10,073,679 B2* | 9/2018 | Straub | G06F 8/34 |
| 10,452,497 B2* | 10/2019 | Straub | G06F 16/958 |
| 2012/0233235 A1* | 9/2012 | Allaire | B01J 6/008 717/109 |
| 2014/0047413 A1* | 2/2014 | Sheive | H04L 65/403 717/110 |
| 2014/0136945 A1* | 5/2014 | Ligman | G06F 40/14 715/234 |
| 2014/0298318 A1* | 10/2014 | Ahn | G06F 8/60 717/174 |
| 2014/0325470 A1* | 10/2014 | Padmavilasom | H04L 67/2823 717/100 |
| 2015/0052219 A1* | 2/2015 | Staudinger | G06F 9/45529 709/217 |
| 2015/0067641 A1* | 3/2015 | Nyisztor | H04L 41/082 717/121 |
| 2015/0254074 A1* | 9/2015 | Padmavilasom | H04L 67/2823 717/120 |
| 2015/0294241 A1* | 10/2015 | Rozenfeld | G06Q 10/06 705/7.11 |
| 2015/0347119 A1* | 12/2015 | Wang | G06F 16/1744 717/120 |
| 2016/0224336 A1* | 8/2016 | Zhou | G06F 8/71 |
| 2017/0134479 A1* | 5/2017 | Kalgi | G06Q 20/3276 |
| 2017/0228263 A1* | 8/2017 | Seitz | G06F 9/4411 |
| 2017/0322782 A1* | 11/2017 | Pakiman | G06F 8/34 |
| 2018/0107343 A1* | 4/2018 | Mills | G06F 8/35 |

OTHER PUBLICATIONS

Bouras, Christos, Andreas Papazois, and Nikolaos Stasinos. "A framework for Cross-Platform mobile web applications using HTML5." 2014 International Conference on Future Internet of Things and Cloud. IEEE, 2014. (Year: 2014).*

* cited by examiner

COMPATIBILITY METHOD BASED ON HYBRID, ADAPTER, OPERATION DEVICE, SYSTEM AND COMPUTER-READABLE STORAGE MEDIUM

FIELD OF INVENTION

The present application relates to the field of computer, and more particularly, to a compatibility method based on Hybrid, an adapter, an operation device, a system and a computer-readable storage medium.

BACKGROUND OF INVENTION

In order to meet the development requirements of mobile applications, hybrid applications (Hybrid APP) developed by using Hybrid development technology are more and more popular due to advantages of low development cost, simple maintenance, good user experience, and cross-platform. The Hybrid APP refers to the application between a native application and a web application, and the Hybrid APP usually uses a native Web view control (Webview) as a carrier, and embeds wap or web pages into the client software to provide functions. The Hybrid APP has the advantages of a good interaction experience of the native application and cross-platform development of web application development (Web App). However, in the existing methods, since each Hybrid framework has its own data encapsulation manner, the difference between the data format in one Hybrid framework and the data format of another Hybrid framework causes that one Hybrid framework cannot use the components of another Hybrid framework, even if a component of an open source Hybrid framework cannot be used by another Hybrid framework, which makes the development cost of the development of hybrid mobile applications more expensive and the development efficiency of the developer more lower.

SUMMARY OF THE INVENTION

The embodiments of the present application provide a compatibility method based on Hybrid, an adapter, an operation device, a system and a computer-readable storage medium, which could make different Hybrids mutually compatible, that is, one Hybrid framework could use components of another Hybrid framework, which saves the development cost of the development work and improves the development efficiency of the developer.

In the first aspect, the embodiments of the present application provide a compatibility method based on Hybrid, and the method comprises: a JS adaptation component of a first Hybrid acquires a second component data from a JS component of a second Hybrid, and the second component data comprises a class name and a method name of a native component of the second Hybrid for executing a current business; the JS adaptation component encapsulates the second component data as a parameter data packet applicable for the first Hybrid; the JS adaptation component transmits a first component data to a bridge module of the first Hybrid, and the first component data comprises the parameter data packet and a pre-stored class name and method name of the native adaptation component of the first Hybrid corresponding to the JS adaptation component, and the class name and the method name of the native adaptation component are used for the bridge module of the first Hybrid to invoke an interface of the corresponding native adaptation component for data transmission; the corresponding native adaptation component acquires the parameter data packet in the first component data from the bridge module of the first Hybrid; the native adaptation component parses the parameter data packet to acquire the class name and the method name of the native component of the second Hybrid; the native adaptation component invokes an interface of the corresponding native component of the second Hybrid according to the class name and the method name of the native component of the second Hybrid and according to a preset calling rule of the native component of the second Hybrid to implement data transmission, so that the native component of the second Hybrid executes the current business.

In the second aspect, the embodiments of the present application provide an adapter, and the adapter is disposed in a first Hybrid, for making a second Hybrid compatible with the first Hybrid, and the adapter comprises a JS adaptation component and a native adaptation component, and the JS adaptation component comprises a first receiving unit, a first encapsulating unit and a first invoking unit, and the native adaptation component comprises a second receiving unit, a parsing unit, and a second invoking unit; the first receiving unit is used for acquiring a second component data from a JS component of the second Hybrid, and the second component data comprises a class name and a method name of a native component of the second Hybrid for executing a current business; the first encapsulating unit is used for encapsulating the second component data as a parameter data packet applicable for the first Hybrid; the first invoking unit is used for transmitting a first component data to a bridge module of the first Hybrid, and the first component data comprises the parameter data packet and a pre-stored class name and method name of the native adaptation component of the first Hybrid corresponding to the JS adaptation component, and the class name and the method name of the native adaptation component are used for the bridge module of the first Hybrid to invoke an interface of the corresponding native adaptation component for data transmission; the second receiving unit is used for the corresponding native adaptation component to acquire the parameter data packet in the first component data from the bridge module of the first Hybrid; the parsing unit is used for parsing the parameter data packet to acquire the class name and the method name of the native component of the second Hybrid; the second invoking unit is used for invoking an interface of the corresponding native component of the second Hybrid according to the class name and the method name of the native component of the second Hybrid and according to a preset calling rule of the native component of the second Hybrid to implement data transmission, so that the native component of the second Hybrid executes the current business.

In the third aspect, the embodiments of the present application provide an operation device based on Hybrid, and the operation device comprises a framework of a first Hybrid, and the first Hybrid comprises an adapter and a bridge module, and the adapter comprises a JS adaptation component and a native adaptation component, and the bridge module of the first Hybrid is used to connect the JS adaptation module and the native adaptation module; the JS adaptation module comprises a first receiving unit, a first encapsulating unit and a first invoking unit, and the native adaptation component comprises a second receiving unit, a parsing unit, and a second invoking unit; the first receiving unit is used for acquiring a second component data from a JS component of the second Hybrid, and the second component data comprises a class name and a method name of a native component of the second Hybrid for executing a current business; the first encapsulating unit is used for encapsulating the second component data as a parameter data packet applicable for the first Hybrid; the first invoking unit is used for transmitting a first component data to a bridge module of the first Hybrid, and the first component data comprises the parameter data packet and a pre-stored class name and method name of the native adaptation component of the first Hybrid corresponding to the JS adaptation component, and the class name and the method name of the native adaptation component are used for the bridge module of the first Hybrid to invoke an interface of the corresponding native adaptation component for data transmission; the second receiving unit is used for the corresponding native adaptation component to acquire the parameter data packet in the first component data from the bridge module of the first Hybrid; the parsing unit is used for parsing the parameter data packet to acquire the class name and the method name of the native component of the second Hybrid; the second invoking unit is used for invoking an interface of the corresponding native component of the second Hybrid according to the class name and the method name of the native component of the second Hybrid and according to a preset calling rule of the native component of the second Hybrid to implement data transmission, so that the native component of the second Hybrid executes the current business.

In the fourth aspect, the embodiments of the present application provide an operation system based on Hybrid, and the operation system comprises a first Hybrid and a JS component of a second Hybrid and a native component of the second Hybrid, and the first Hybrid comprises an adapter and a bridge module, and the adapter comprises a JS adaptation component and a native adaptation component, and the bridge module of the first Hybrid is used to connect the JS adaptation module and the native adaptation module, and the JS adaptation component is used to connect the JS component of the second Hybrid and the bridge module of the first Hybrid, and the native adaptation component is used to connect the bridge module of the first Hybrid and the native component of the second Hybrid, wherein, the JS adaptation module comprises a first receiving unit, a first encapsulating unit and a first invoking unit, and the native adaptation component comprises a second receiving unit, a parsing unit, and a second invoking unit; the first receiving unit is used for acquiring a second component data from a JS component of the second Hybrid, and the second component data comprises a class name and a method name of a native component of the second Hybrid for executing a current business; the first encapsulating unit is used for encapsulating the second component data as a parameter data packet applicable for the first Hybrid; the first invoking unit is used for transmitting a first component data to a bridge module of the first Hybrid, and the first component data comprises the parameter data packet and a pre-stored class name and method name of the native adaptation component of the first Hybrid corresponding to the JS adaptation component, and the class name and the method name of the native adaptation component are used for the bridge module of the first Hybrid to invoke an interface of the corresponding native adaptation component for data transmission; the second receiving unit is used for the corresponding native adaptation component to acquire the parameter data packet in the first component data from the bridge module of the first Hybrid; the parsing unit is used for parsing the parameter data packet to acquire the class name and the method name of the native component of the second Hybrid; the second invoking unit is used for invoking an interface of the corresponding native component of the second Hybrid according to the class name and the method name of the native component of the second Hybrid and according to a preset calling rule of the native component of the second Hybrid to implement data transmission, so that the native component of the second Hybrid executes the current business.

In the fifth aspect, the embodiments of the present application provide a computer-readable storage medium, wherein, the computer-readable storage medium stores one or more programs, and the one or more programs could be executed by one or more processors to implement the following steps: acquiring a second component data from a JS component of a second Hybrid; encapsulating the second component data as a parameter data packet applicable for a first Hybrid; transmitting a first component data to a bridge module of the first Hybrid, and the first component data comprises the parameter data packet and a pre-stored class name and method name of a native adaptation component corresponding to a JS adaptation component; transmitting the first component data to a native layer; invoking a native adaptation interface of the corresponding native adaptation component according to the class name and method name of the native adaptation component in the first component data to implement data transmission; acquiring the parameter data packet in the first component data from the bridge module of the first Hybrid; parsing the parameter data packet to acquire a class name and a method name of a native component of the second Hybrid; invoking an interface of the corresponding native component of the second Hybrid according to the class name and the method name of the native component of the second Hybrid and according to a preset calling rule of the native component of the second Hybrid to implement data transmission, so that the native component of the second Hybrid executes the current business.

In the sixth aspect, the embodiments of the present application provide an operation system based on Hybrid, and the operation system comprises a first Hybrid and a second Hybrid, and the first Hybrid comprises an adapter and a bridge module, ant the adapter comprises a JS adaptation component and a native adaptation component, and the bridge module of the first Hybrid is used to connect the JS adaptation component and the native adaptation component, and the JS adaptation component is used to connect a JS component of the second Hybrid and the bridge module of the first Hybrid, and the native adaptation component is used to connect the bridge module of the first Hybrid and a native component of the second Hybrid, and the system further comprises one or more processors and a memory, and the processor and the memory are connected by a bus; wherein, the memory is used to store a program for realizing the first Hybrid, the second Hybrid and a communication between the first Hybrid and the second Hybrid; the processor is used to execute the program stored in the memory for realizing the first Hybrid, the second Hybrid and the communication between the first Hybrid and the second Hybrid, to perform the following operations: acquiring a second component data from a JS component of a second Hybrid; encapsulating the second component data as a parameter data packet applicable for a first Hybrid; transmitting a first component data to a bridge module of the first Hybrid, and the first component data comprises the parameter data packet and a pre-stored class name and method name of a native adaptation component corresponding to a JS adaptation component; transmitting the first component data to a native layer; invoking a native adaptation interface of the corresponding native adaptation component of the first Hybrid according to the class name and method name of the native adaptation component in the first component data to implement data transmission; acquiring the parameter data packet in the first component data from the bridge module of the first Hybrid; parsing the parameter data packet to acquire a class name and a method name of a native component of the second Hybrid; invoking an interface of the corresponding native component of the second Hybrid according to the class name and the method name of the native component of the second Hybrid and according to a preset calling rule of the native component of the second Hybrid to implement data transmission, so that the native component of the second Hybrid executes the current business.

A compatibility method based on Hybrid, an adapter, an operation device, a system and a computer-readable storage medium disclosed in the embodiments of the present application encapsulate the second component data of the second Hybrid as the parameter data packet applicable for the first Hybrid by the above method, so that the second component data of the second Hybrid could be passed to the bridge module of the first Hybrid, and the native adapting component invokes the interface of the native component of the second Hybrid according to the calling rule of the native component of the second Hybrid to transmit data, realizing the mutual compatibility of different Hybrids, thereby enabling one Hybrid be able to invoke the component of another Hybrid, which saves the development cycle and cost and improves the development efficiency.

BRIEF DESCRIPTION OF THE DRAWINGS

In order to more clearly describe the technical solutions of the embodiments of the present application, the accompanying drawings used in the embodiments are briefly described below. Obviously, the drawings in the following description are some embodiments of the present application, and for person skilled in the art, other drawings may also be obtained according to these drawings without any creative work.

DESCRIPTION OF THE EMBODIMENTS

The technical solutions of the embodiments of the present application will be clearly and completely described below with reference to the accompanying drawings of the embodiments of the present application. Obviously, the described embodiments are some but not all of the embodiments of the present application. All other embodiments obtained by person skilled in the art based on the embodiments of the present application without creative efforts shall fall into the protection scope of the present application.

It will be understood that, when used in this specification and the appended claims, the terms "comprising" and "including" indicate the existence of stated features, entirety, steps, operations, elements and/or components, but do not exclude the existence or addition of one or more other features, entirety, steps, operations, elements, components and/or sets thereof. It will also be understood that, the terminology used in the description of the present application herein is only for the purpose of describing particular embodiments and is not intended to limit the present application. As used in the description and the appended claims of the present application, the singular forms "a," "an," and "the" also comprise the plural forms as well, unless the context clearly indicates otherwise.

Figure 1:
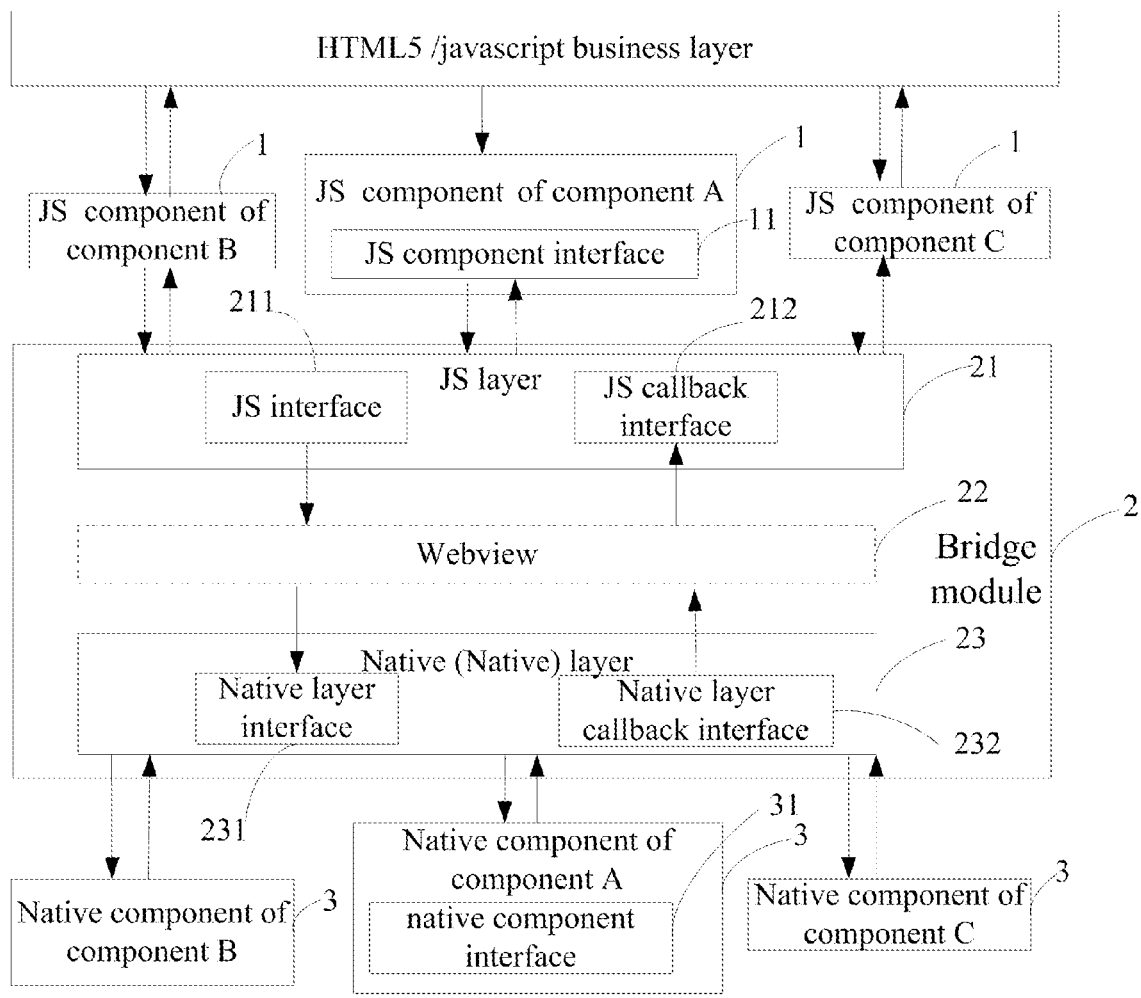
FIG. 1 is a structure schematic diagram of a standard Hybrid provided by the present application.

Please refer to FIG. 1, which is a first schematic diagram of a framework of a standard Hybrid provided by the present application. As shown in the figure, the existing framework of a standard Hybrid comprises a bridge module 2, one or more JS (Javascript) components 1 in communication connection with the bridge module 2, and one or more native (Native) components 3, wherein, the JS component 1 and the native component 3 have a corresponding relationship. In the present embodiment, it is preferred that the JS component 1 and the native component 3 having the corresponding relationship are a code of a Hybrid component with a specific function on the JS side and a code of the Hybrid com on the Native side, that is, a Hybrid component comprises a group of the JS component 1 and the native component 3. The specific function represents function that handles specific businesses. As shown in the figure, a Hybrid component A comprises a JS component and a native component, and the JS component is the code of the component A on the JS side, and the native component is the code of the component A on the native side.

It should be noted that the bridge module 2 is a JSBirdge of the Hybrid, and the function of the bridge module 2 is the communication bridge between the JS component 1 and the native component 3. The bridge module 2 comprises a JS layer 21 and a native (native) layer 23, wherein, the native layer 23 is a layer of a native code, and the native code is the code of a development of a traditional client software such as ios/android, that's, a client software developed using voices and tools of a specific platform. The JS layer 21 comprises a JS interface 211 and a JS callback interface 212; the native layer 23 comprises a native layer interface 231 and a native layer callback interface 232. The JS interface 211 is used to receive a calling notification of the JS component 1; the JS callback interface is used to call back the JS component interface of the corresponding JS component; the native layer interface 231 is used for the native layer 23 of the Hybrid to receive a calling notification of the JS layer 21; the native layer callback interface 232 is used for the native layer 23 of the Hybrid to send a callback of the native component 3 to the JS callback interface 212 after receiving the callback. The application program APP developed by Hybrid is a combination of web application development and native application development, for example, a button on a front-end page, after clicking the button, a time-consuming task needs to be performed by the local end.

Therefore, when the standard Hybrid executes business, the data transmission process is as follows: JS component 1 receives business data from the HTML5/javascript business layer through the JS component interface 11, and the JS component 1 then invokes the JS interface 211 of the bridge module 2 to transmit data; the data is transmitted to the native (native) layer 23 through the native Web view control 22; the native layer 23 then invokes the native component interface 31 of the native component 3 to transmit data for executing the business. The callback data after executing the business is transmitted by the native layer callback interface 232 of the bridge module 2 invoked by the native component 3, and is transmitted to the JS layer 21 by the native Web view control 22, and is returned to the JS component 1 by calling the JS component interface 11. Wherein, the native Web view control 22 is an APP embedded browser control as a carrier.

Because, among different Hybrids, the calling manner between the JS component 1, the native component 3 and the bridge module 2 may be different or the data encapsulation manner is different, for example, that a calling rule of a Hybrid calling a native component is different or a data encapsulation manner of a Hybrid is different from a data encapsulation manner of another Hybrid could cause that a Hybrid cannot invoke a component of another Hybrid, which makes different Hybrids incompatible. In order to solve the above problem that different Hybrids are incompatible, the embodiment of the present application provides an adapter, which is an adaptation component for realizing that the JS component and the native component of the second Hybrid communicate with the first Hybrid, and the adapter is developed according to a rule of a component of the first Hybrid, therefore, the adapter may be regarded as a component of the first Hybrid with an adaptation function, such as an adaptation component. In the embodiment of the present application, the adapter comprises a JS adaptation component and a native adaptation component, wherein the JS adaptation component could be regarded as a JS component of the first Hybrid, the native adaptation component could be regarded as a native component of the first Hybrid, and the JS adaptation component and the native adaptation component are the code of the adaptation component on the JS side and the code of the adaptation component on the native side.

Figure 2:
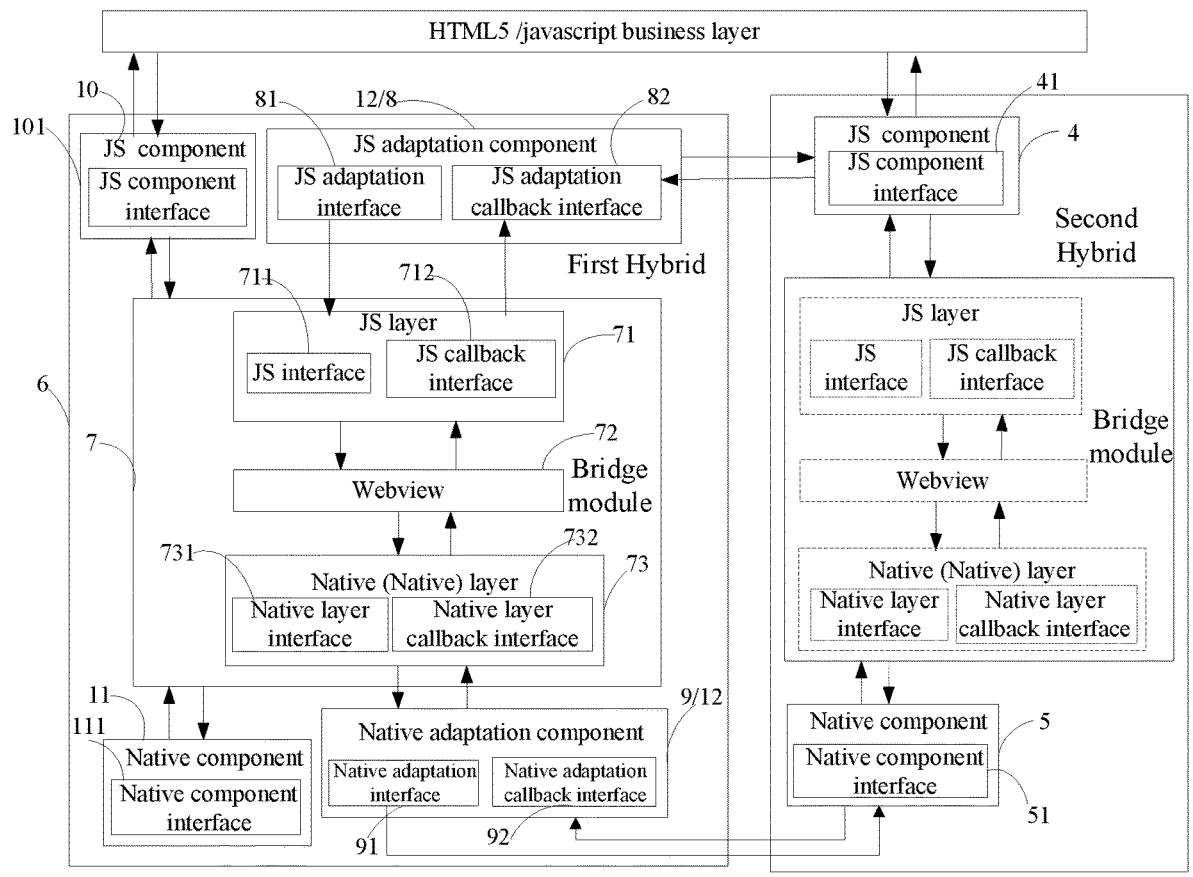
FIG. 2 is a structure schematic diagram of an operation system based on Hybrid provided by an embodiment of the present application.

Please refer to FIG. 2, which is a structure schematic diagram of an operation system based on Hybrid provided by the embodiment of the present application. As shown in the figure, the operation system comprises a first Hybrid 6 and one or more JS components 4 of a second Hybrid and one or more native components 5 of the second Hybrid. The first Hybrid 6 comprises an adapter 12 and a bridge module 7 and one or more JS components 10 of the first Hybrid and one or more native components 11 of the first Hybrid, wherein the adapter 12 comprises a JS adaptation component 8 and a native adaptation component 9, the bridge module 7 of the first Hybrid is connected between the JS adaptation component 8 and the native adaptation component 9. The adaptor 12 is an adaptation component for realizing that the JS component 4 of the second Hybrid and the native component 5 of the second Hybrid communicate with the first Hybrid 6, so that the first Hybrid 6 could invoke the JS component 4 of the second Hybrid and the native component 5 of the second Hybrid. In specific implementation, the JS adaptation component 8 is configured to connect the JS component 4 of the second Hybrid and the bridge module 7 of the first Hybrid; the native adaptation component 9 is configured to connect the native component 5 of the second Hybrid and the bridge module 7 of the first Hybrid, so as to achieve the JS component 4 of the second Hybrid and the native component 5 of the second Hybrid communicate with the first Hybrid 6.

Wherein, the JS component 4 of the second Hybrid and the native component 5 of the second Hybrid are components having a corresponding relationship. In the present embodiment, a pair of the JS component 4 of the second Hybrid and the native component 5 of the second Hybrid is two small components of the second Hybrid components with specific functions, preferably, the JS component 4 of the second Hybrid is in one-to-one correspondence with the native components 5 of the second Hybrid; in other feasible embodiments, the JS component 4 of the second Hybrid and the native component 5 of the second Hybrid may be in a one-to-many or many-to-many relationship, and the corresponding relationship is divided according to the business requirements. It should be understood that, the pair of the JS component 4 of the second Hybrid and the native component 5 of the second Hybrid are the code of the second Hybrid component on the JS side and the code on the Native side. Similarly, the JS adaptation component 8 and the native adaptation component 9 have a corresponding relationship, and the JS component 10 of the first Hybrid and the native component 11 of the first Hybrid have a corresponding relationship.

Figure 3:
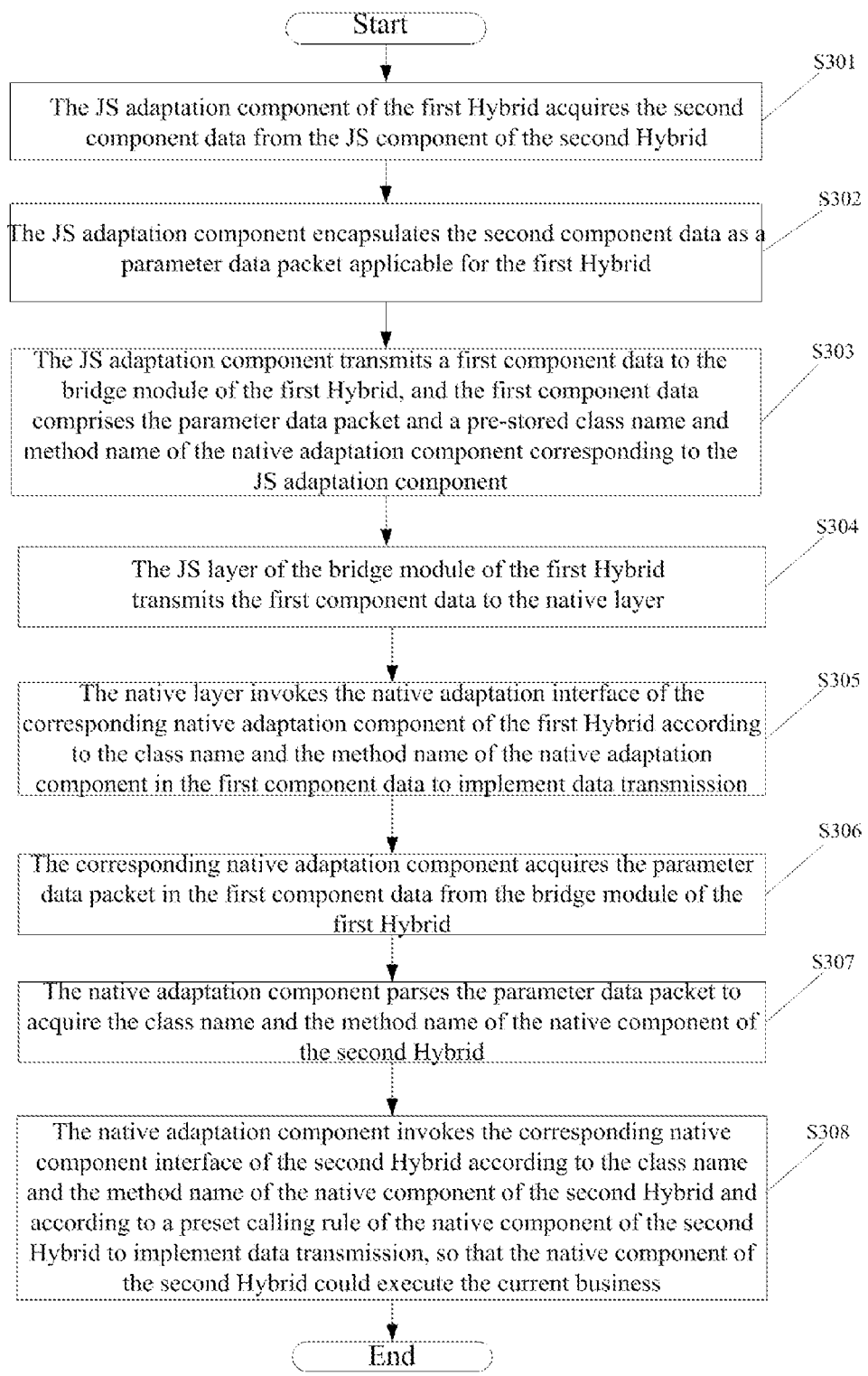
FIG. 3 is a schematic flowchart of a compatibility method based on Hybrid provided by an embodiment of the present application.

Based on the above-mentioned adapter and the structure of the operation system, the embodiment of the present application provides a compatibility method based on Hybrid, the compatibility method makes two or more Hybrid frameworks compatible, and one Hybrid framework could invoke the components of another Hybrid framework, saving development cost. Please refer to FIG. 3, which is a schematic flowchart of a compatibility method based on Hybrid provided by an embodiment of the present application. As shown in the figure, the compatibility method comprises steps S301~S309:

S301, the JS adaptation component of the first Hybrid acquires the second component data from the JS component of the second Hybrid.

Specifically, as seen from the structure of the operation system, the first Hybrid comprises the adapter and the bridge module, and the adapter comprises the JS adaptation component and the native adaptation component, and the JS adaptation component connects the JS component of the second Hybrid and the bridge module of the first Hybrid; the native adaptation component is used to connect the native component of the second Hybrid and the bridge module of the first Hybrid.

The second component data comprises a class name and a method name of the native component of the second Hybrid for executing the current business. It should be understood that, the class name and method name of a component are the identities of the component, and the interface corresponding to the component could be invoked according to the class name and method name of the component to implement data transmission. Therefore, the class name and method name of the native component of the second Hybrid are the identities of the native component of the second Hybrid, and the corresponding native component of the second Hybrid could be invoked according to the above class name and method name. Further, the second component data also comprises the input parameters of the native component of the second Hybrid. The input parameters are parameters that need to be passed to the native component of the second Hybrid and is related to the current business, so that the native component of the second Hybrid could execute the current business. In some embodiments, the input parameters are business parameters delivered from the business layer. In other embodiments, the input parameters are parameters which are obtained by data encapsulation or formatting of business parameters delivered by the business layer and are applicable for a calling method. Further, the second component data also comprises a success callback function and a failure callback function used for data callback.

It should be noted that the JS adaptation component comprises a JS adaptation interface, and the JS adaptation component acquires the second component data from the JS component of the second Hybrid through the JS adaptation interface. In some embodiments, if the JS interfaces exposed by the different Hybrids to the JS components are different, the JS adaptation interface simulates the JS interface of the second Hybrid so that the JS component of the second Hybrid invokes the JS adaptation interface, wherein the JS interface of the second Hybrid is intended to be used for the bridge module of the second Hybrid to receive the calling notification of the JS component of the second Hybrid to acquire the second component data. In other embodiments, if the JS interfaces exposed by different Hybrids to the JS components are the same, the JS adaptation interface is the same as the JS interface of the second Hybrid. It should be understood that, since the JS adaptation interface simulates the JS interface of the second Hybrid or the JS adaptation interface is the same as the JS interface of the second Hybrid, the second component data could also be invoked to the JS adaptation interface to implement data transmission when the second component data is not modified, and a detailed description will be given below.

It should be further noted that in other embodiments, before the JS adaptation component acquires the second component data from the JS component of the second Hybrid, the method further comprises:

The JS adaptation component acquires the information of the JS component of the second Hybrid to be communicated from the business layer; the JS adaptation component sends a calling instruction to the JS component of the second Hybrid, and the calling instruction is used to make the JS component of the second Hybrid to invoke the JS adaptation interface of the JS adaptation component according to the calling instruction to transmit the JS component data of the second Hybrid, for example, the calling instruction may comprise the information of the JS adaptation interface of the JS adaptation component and the calling rule, and the like.

S302, the JS adaptation component encapsulates the second component data as a parameter data packet applicable for the first Hybrid.

Specifically, the second component data is encapsulated as the parameter data packet according to a preset parameter law applicable for the calling of the first Hybrid, wherein the parameter law comprises an organization manner and a structure of the data, and so on. It should be understood that, it's based on different parameter laws of different Hybrids that causes the second component data cannot be directly transmitted to the bridge module of the first Hybrid. It should be understood that, the parameter data packet could be regarded as an incoming parameter transmitted from the JS adaptation component to the native adaptation component, that is, the second component data is encapsulated as the way of the incoming parameter of the native adaptation component.

S303, the JS adaptation component transmits a first component data to the bridge module of the first Hybrid, and the first component data comprises the parameter data packet and a pre-stored class name and method name of the native adaptation component corresponding to the JS adaptation component.

Specifically, the class name and the method name of the native adaptation component are used for the bridge module of the first Hybrid to invoke the interface of the corresponding native adaptation component for data transmission, wherein that the JS adaptation component transmits the first component data to the bridge module of the first Hybrid specifically comprises: the JS adaptation component invokes the JS interface of the first Hybrid to transmit the first component data to the bridge module of the first Hybrid.

This is based on that the JS adaptation component could be regarded as a JS component of the first Hybrid, so the JS adaptation component could directly invoke the JS interface of the first Hybrid. On the other hand, by the above transmission, the first component data is passed to the JS layer of the bridge module of the first Hybrid and is performed some processing at the JS layer.

S304, the JS layer of the bridge module of the first Hybrid transmits the first component data to the native layer.

Specifically, the first component data is transmitted to the native layer through Webview, that is, the data transmission is implemented by calling the native layer interface of the first Hybrid.

S305, the native layer invokes the native adaptation interface of the corresponding native adaptation component of the first Hybrid according to the class name and the method name of the native adaptation component in the first component data to implement data transmission.

This is based on that the native adaptation component could be regarded as a native component of the first Hybrid, so the native layer could directly invoke the native adaptation interface of the native adaptation component.

S306, the corresponding native adaptation component acquires the parameter data packet in the first component data from the bridge module of the first Hybrid.

S307, the native adaptation component parses the parameter data packet to acquire the class name and the method name of the native component of the second Hybrid.

It should be understood that, parsing parameter data packet could also acquire the input parameters of the native component of the second Hybrid.

S308, the native adaptation component invokes the corresponding native component interface of the second Hybrid according to the class name and the method name of the native component of the second Hybrid and according to a preset calling rule of the native component of the second Hybrid to implement data transmission, so that the native component of the second Hybrid could execute the current business.

Specifically, there may be different calling rules for the bridge modules of different Hybrids to invoke the native component, so invoking the native component of the second Hybrid by the native adaptation component needs to be in accordance with the calling rule of the native component of the second Hybrid. For example, when the calling function is different, it needs to be invoked according to the calling function of the native component of the second Hybrid. It should also be understood that, the corresponding native component interface of the second Hybrid is invoked to send the incoming parameter of the native component of the second Hybrid to the corresponding native component of the second Hybrid.

Compared with the above solution, preferably, that the JS adaptation component acquires the second component data from the JS component of the second Hybrid, specifically comprises:

The JS adaptation component acquires the second component data from the JS component of the second Hybrid through the JS adaptation interface, and the JS adaptation interface simulates a JS interface of the second Hybrid, and the JS interface of the second Hybrid is used for the bridge module of the second Hybrid to acquire the second component data from the JS component of the second Hybrid.

It should be noted that, based on that the JS interfaces exposed to the JS components by different Hybrids are different, the above solution is preferably implemented. For example, if the JS interface of the second Hybrid exposed to the JS component of the second Hybrid by the second Hybrid is different from the JS interface of the first Hybrid exposed to the JS component of the first Hybrid by the first Hybrid, the JS adaptation interface needs to simulate the JS interface of the second Hybrid. On the other hand, in other feasible embodiments, if the JS interface of the second Hybrid exposed to the JS component of the second Hybrid by the second Hybrid is same as the JS interface of the first Hybrid exposed to the JS component of the first Hybrid by the first Hybrid, the JS adaptation interface also needs to be the same as the JS interface of the second Hybrid for data transmission.

It should also be noted that, in some feasible embodiments, the JS adaptation interface comprises a first JS adaptation interface and a second JS adaptation interface, wherein the second JS adaptation interface is used for the JS adaptation component to acquire the second component data from the JS component of the second Hybrid, and the second JS adaptation interface simulates the JS interface of the second Hybrid; the first JS adaptation interface is used for the JS adaptation component to invoke the JS interface of the first Hybrid to implement data transmission, and the first JS adaptation interface is the same as the JS component interface of the first Hybrid. In other possible embodiments, the JS adaptation interface acts as an interface invoked by the native component of the second Hybrid and also as an interface for invoking the JS interface of the first Hybrid.

Similarly, in some feasible embodiments, the native adaptation interface comprises a first native adaptation interface and a second native adaptation interface, wherein the first native adaptation interface is the same as the native component interface of the first Hybrid, and is used to be invoked by the native layer of the first Hybrid to transmit data; the second native adaptation interface is used for invoking the native component interface of the second Hybrid to implement data transmission. Or in other feasible embodiments, the native adaptation interface acts as an interface invoked by the native layer of the bridge module of the first Hybrid and also as an interface for invoking the native component interface of the second Hybrid.

In conclusion, based on that the component data encapsulation manners acquired from the JS component by the bridge module of different Hybrids, the component data of one Hybrid cannot be directly passed to the bridge module of another Hybrid, and therefore, the embodiment of the present application encapsulates the second component data of the second Hybrid as the parameter data packet applicable for the first Hybrid by the above method, so that the second component data could be passed to the bridge module of the first Hybrid; on the other hand, there may be different calling rules for the bridge modules of different Hybrids to invoke the native component, which causes that the bridge module of one Hybrid cannot pass data into the native component of another Hybrid, therefore, in the embodiment of the present application, by the above method, the native adaptation component invokes the native component interface of the second Hybrid according to the calling rule of the native component of the second Hybrid to transmit data. Further- more, if the JS interfaces exposed by the bridge modules of different Hybrids to the JS components are different and then are not compatible with each other, in the embodiment of the present application, by the above method, the JS adaptation interface of the JS adaptation component simulates the JS interface of the second Hybrid, so that the JS adaptation component could acquire the second component data from the JS component of the second Hybrid.

Figure 4:
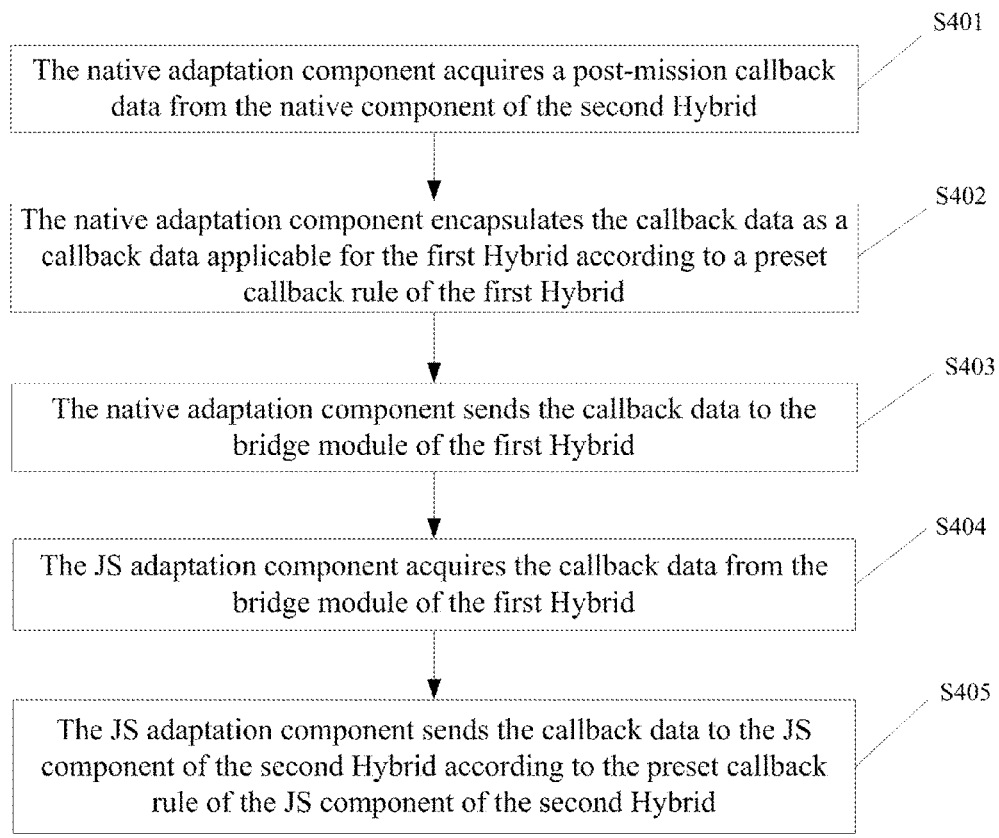
FIG. 4 is a schematic flowchart of a callback process in a compatibility method based on Hybrid provided by an embodiment of the present application.

Compared with the above solution, in other feasible embodiments, if the data needs to be called back after executing the current business, the callback data after executing the business needs to be called back from the native component of the second Hybrid to the JS component of the second Hybrid. Please refer to FIG. 4, which is a schematic flowchart of a callback process in a compatibility method based on Hybrid provided by an embodiment of the present application. As shown in the figure, the above compatibility method based on Hybrid, further comprises:

S401, the native adaptation component acquires a post-mission callback data from the native component of the second Hybrid.

Specifically, the callback data is the data generated after executing the business. For example, when the information on the page needs to be updated synchronously after the local completes the task, the data generated after the local completes the task needs to be returned to the JS component.

On the one hand, if a native layer callback interface of the second Hybrid exposed to the native component of the second Hybrid by the second Hybrid is different from a native layer callback interface exposed to the native component of the first Hybrid by the first Hybrid, preferably, the native adaptation component comprises the native adaptation callback interface, and the native adaptation component acquires the post-mission callback data from the native component of the second Hybrid, specifically comprises:

the native adaptation component acquires the post-mission callback data from the native component of the second Hybrid through the native adaptation callback interface, and the native adaptation callback interface simulates the native layer callback interface of the second Hybrid, and the native layer callback interface of the second Hybrid is intended to be used for the bridge module of the second Hybrid to acquire the callback data from the JS component of the second Hybrid.

Or in other feasible embodiments, the native adaptation callback interface is the same as the native layer callback interface of the second Hybrid.

S402, the native adaptation component encapsulates the callback data as a callback data applicable for the first Hybrid according to a preset callback rule of the first Hybrid.

Specifically, based on that the data encapsulation manners of the callback data needed by the bridge modules of different Hybrids are different, therefore, the callback data of one Hybrid is not applicable for bridge module of a different Hybrid. Therefore, in the present embodiment, the callback data is encapsulated as a callback data applicable for the first Hybrid.

S403, the native adaptation component sends the callback data to the bridge module of the first Hybrid.

This is based on that the native adaptation component could be regarded as a native component of the first Hybrid, so the native adaptation component could directly invoke the native layer callback interface of the native layer to send the callback data. Wherein, in the bridge module of the first Hybrid, the callback data passes through the native layer, the Webview, and then to the JS layer.

S404, the JS adaptation component acquires the callback data from the bridge module of the first Hybrid.

This is based on that the JS adaptation component could be regarded as a JS component of the first Hybrid, and the JS layer in the bridge module of the first Hybrid could directly invoke the JS adaptation callback interface of the JS adaptation component to transmit the callback data.

S405, the JS adaptation component sends the callback data to the JS component of the second Hybrid according to the preset callback rule of the JS component of the second Hybrid.

Specifically, there may be different calling rules for the bridge modules of different Hybrids to invoke the JS component, so invoking the JS component of the second Hybrid by the JS adaptation component needs to be in accordance with the calling rule of the JS component of the second Hybrid. For example, when the calling function is different, it needs to be invoked according to the calling function of the JS component of the second Hybrid.

Compared with the above solution, it is further preferable to invoke the callback data according to the instantiation object, and based on the above method of callback process, wherein, before the step S305, the native layer invokes the native adaptation interface of the corresponding native adaptation component of the first Hybrid according to the class name and the method name of the native adaptation component in the first component data to implement the data transmission, the compatibility method further comprises: the native layer generates a first callback instance object of the native adaptation component according to the first component data. Specifically, the first callback instance object of the native adaptation component is generated according to the parameter data packet in the first component data and the class name and method name of the native adaptation component, and the process of instantiating the object is: instantiating the corresponding class object according to reflection mechanism, and invoking the corresponding method name, and putting the parameter information related to the business into the parameters of the calling method.

Therefore, the step S306, the corresponding native adaptation component acquires the parameter data packet in the first component data from the bridge module of the first Hybrid, specifically comprises: the corresponding native adaptation component acquires the parameter data packet in the first component data and the first callback instance object from the bridge module of the first Hybrid.

Therefore, the step S308, the native adaptation component invokes the interface of the corresponding native component of the second Hybrid according to the class name and the method name of the native component of the second Hybrid and according to the preset calling rule of the native component of the second Hybrid to implement data transmission, specifically comprises: the native adaptation component simulates to obtain a second callback instance object of the native component of the second Hybrid according to the second component data; and the native adaptation component invokes the interface of the corresponding native component of the second Hybrid according to the class name and the method name of the native component of the second Hybrid and according to the preset calling rule of the native component of the second Hybrid to transmit the second callback instance object and the input parameters to the native component of the second Hybrid.

Specifically, the second callback instance object of the native component of the second Hybrid is generated according to the class name and the method name of the native component of the second Hybrid in the second component data and the input parameters.

Therefore, the step S401, the native adaptation component acquires the post-mission callback data from the native component of the second Hybrid, specifically comprises: the native adaptation component acquires the callback data from the native component of the second Hybrid according to the second callback instance object of the native component of the second Hybrid.

Further preferably, the native adaptation component acquires the callback data from the native component of the second Hybrid according to the second callback instance object of the native component of the second Hybrid and through the native adaptation callback interface. Wherein, the native adaptation callback interface simulates the native layer callback interface of the second Hybrid.

Therefore, the S402, the native adaptation component encapsulates the callback data as a callback data applicable for the first Hybrid according to a preset callback rule of the first Hybrid, specifically is: the native adaptation component encapsulates the callback data as a data applicable for the first callback instance object of the first Hybrid according to a preset callback rule of the first Hybrid.

It should be understood that, when invoking the callback data according to the instantiation object, the native adaptation component invokes the callback data from the native component of the second Hybrid according to the second callback instance object, and the bridge module of the first Hybrid invokes the callback data from the native adaptation component according to the first callback instance object. Through the above method, the calling path of the callback data could be confirmed more quickly, improving the callback efficiency. Wherein, the first callback instance is generated at the native layer of the bridge module of the first Hybrid; the second callback instance is generated at the native adaptation component.

It should also be noted that, in some feasible embodiments, the native adaptation callback interface comprises a first native adaptation callback interface and a second native adaptation callback interface, wherein the second native adaptation callback interface is used for the native adaptation component to acquire the callback data from the native component of the second Hybrid, and the second native adaptation callback interface simulates the native layer callback interface of the second Hybrid; the first native adaptation callback interface is used for the native adaptation component to invoke the first native layer callback interface of the native layer of the bridge module of the first Hybrid, and the first native adaptation callback interface is the same as the interface of the native component of the first Hybrid. In other feasible embodiments, the native adaptation callback interface acts as an interface invoked by the native component of the second Hybrid and also as an interface for invoking the interface of the first native layer callback interface of the native layer.

Similarly, in some feasible embodiments, the JS adaptation callback interface comprises a first JS adaptation callback interface and a second JS adaptation callback interface, wherein the first JS adaptation callback interface is the same as the JS component interface of the first Hybrid of the JS component of the first Hybrid, and is used to be invoked by the JS layer of the bridge module of the first Hybrid to transmit data; and the second JS adaptation callback interface is used to invoke the interface of the JS component of the second Hybrid to implement data transmission. Or in other feasible embodiments, the JS adaptation callback interface acts as an interface invoked by the JS layer of the bridge module of the first Hybrid and also as an interface for invoking the interface of the JS component of the second Hybrid.

In conclusion, when the callback data needs to be returned to the native component of the second Hybrid, based on that the callback data encapsulation manners of different Hybrids are different, a callback data of one Hybrid cannot be directly passed to the bridge module of another Hybrid, and therefore, the embodiment of the present application encapsulates the callback data of the second Hybrid as the callback data applicable for the first Hybrid by the above method, so that the callback data could be passed to the bridge module of the first Hybrid; on the other hand, there may be different calling rules for the bridge modules of different Hybrids to invoke the JS component, which causes that the bridge module of one Hybrid cannot pass data into the JS component of another Hybrid, therefore, in the embodiment of the present application, by the above method, the JS adaptation component invokes the interface of the JS component of the second Hybrid according to the calling rule of the JS component of the second Hybrid to transmit data. Furthermore, if the native layer callback interfaces exposed by the bridge modules of different Hybrids to the native components are different and then are not compatible with each other, in the embodiment of the present application, the native adaptation callback interface of the native adaptation component simulates the native layer callback interface of the second Hybrid, so that the native adaptation component could acquire the callback data from the native component of the second Hybrid. On the other hand, the data callback may also be performed according to the instantiation object, and specifically, the native adaptation component invokes the callback data from the native component of the second Hybrid according to the second callback instance object, and the bridge module of the first Hybrid invokes the callback data from the native adaptation component according to the first callback instance object, improving the callback efficiency.

Figure 5:
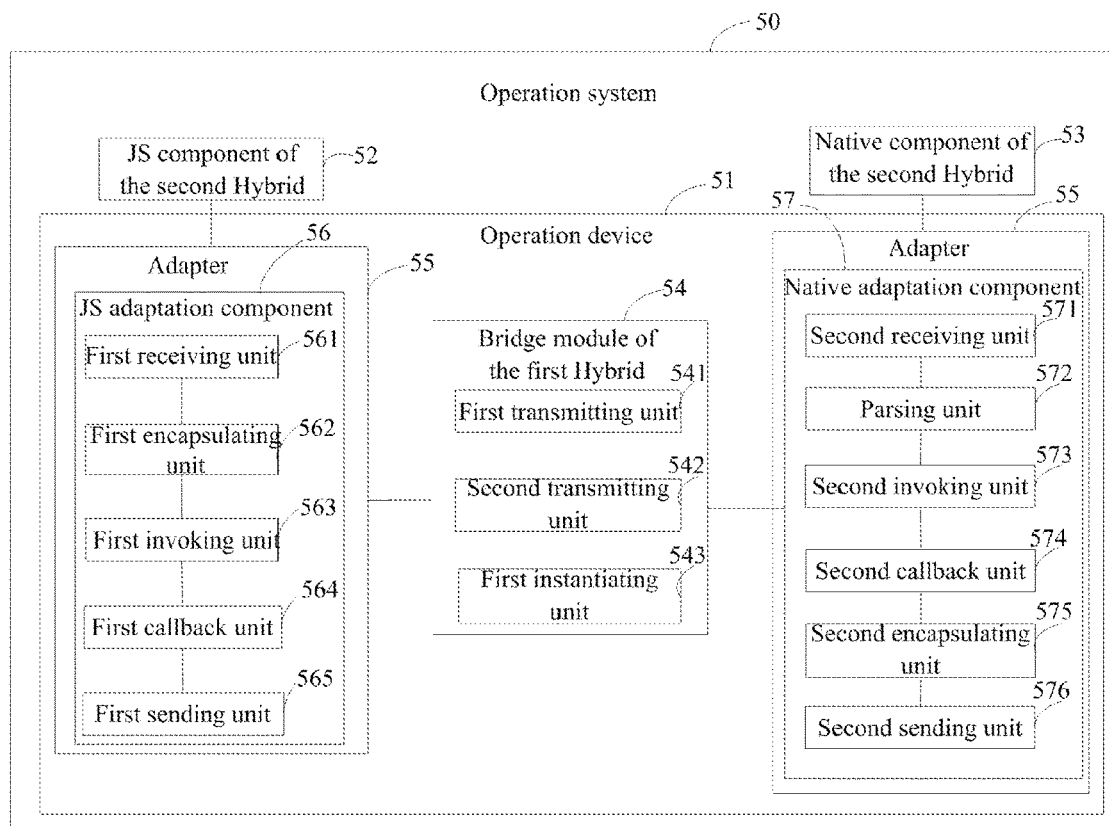
FIG. 5 is a function module diagram of an operation system based on Hybrid provided by an embodiment of the present application.

Please refer to FIG. 5, which is a function module diagram of an operation system based on Hybrid provided by an embodiment of the present application. As shown in the figure, the operation system 500 comprises operation device 51 one or more JS components 52 of the second Hybrid and one or more native components 53 of the second Hybrid. Wherein, the operation device 51 comprises a first Hybrid, and the first Hybrid comprises an adapter 55 and a bridge module 54. The adapter 55 comprises a JS adaptation component 56 and a native adaptation component 57, wherein the bridge module 54 of the first Hybrid is used to connect the JS adaptation module 56 and the native adaptation module 57.

Wherein, the JS adaptation component 56 comprises a first receiving unit 561, a first encapsulating unit 562, and a first invoking unit 563, and the native adaptation component 57 comprises a second receiving unit 571, a parsing unit 572, and a second invoking unit 573. The bridge module 54 of the first Hybrid comprises a first transmitting unit 541 and a second transmitting unit 542.

The first receiving unit 561 is used for JS adaptation component 56 to acquire the second component data from the JS component 52 of the second Hybrid.

Specifically, the second component data comprises a class name and a method name of the native component 53 of the second Hybrid for executing the current business. The class name and method name of the native component 53 of the second Hybrid are the identities of the native component 53 of the second Hybrid, and the corresponding native component 53 of the second Hybrid could be invoked according to the above class name and method name. Further, the second component data also comprises input parameters of the native component 53 of the second Hybrid. The input parameters are parameters that need to be passed to the native component 53 of the second Hybrid and is related to the current business, so that the native component 53 of the second Hybrid could execute the current business. Further, the second component data also comprises a success callback function and a failure callback function.

It should be noted that, the JS adaptation component comprises a JS adaptation interface, and the first receiving unit 561 acquires the second component data from the JS component of the second Hybrid through the JS adaptation interface, wherein the JS adaptation interface simulates the JS interface of the second Hybrid or the JS adaptation interface is the same as the JS interface of the second Hybrid, and the JS interface of the second Hybrid is used for the bridge module of the second Hybrid to receive the calling notification of the JS component of the second Hybrid to acquire the second component data, so the second component data could also be invoked to the JS adaptation interface to implement data transmission when the second component data is not modified.

In some other embodiments, the first receiving unit 561 is further used for the JS adaptation component to acquire the information of the JS component of the second Hybrid to be communicated from the business layer. The JS adaptation component 56 also comprises a first sending unit, the first sending unit is used for the JS adaptation component to send a calling instruction to the JS component of the second Hybrid, and the calling instruction is used to make the JS component of the second Hybrid to invoke the JS adaptation interface of the JS adaptation component according to the calling instruction to transmit the JS component data of the second Hybrid.

The first encapsulating unit 562 is used for the JS adaptation component 56 to encapsulate the second component data as a parameter data packet applicable for the first Hybrid.

Specifically, the second component data is encapsulated as a parameter data packet according to a preset parameter law applicable for the calling of the first Hybrid, wherein the parameter law comprises an organization manner and a structure of the data, and so on. It should be understood that, the parameter data packet could be regarded as an incoming parameter transmitted from the JS adaptation component 56 to the native adaptation component 57, that is, the second component data is encapsulated as the way of the incoming parameter of the native adaptation component 57.

The first invoking unit 563 is used for the JS adaptation component 56 to transmit the first component data to the bridge module 54 of the first Hybrid, and the first component data comprises the parameter data packet and a pre-stored class name and method name of the native adaption component 57 corresponding to the JS adaptation component 56.

Specifically, the class name and the method name of the native adaptation component 57 are used for the bridge module 54 of the first Hybrid to invoke the interface of the corresponding native adaptation component 57 for data transmission, wherein, when the first invoking unit 563 transmits the first component data to the bridge module 54 of the first Hybrid, the first invoking unit 563 is specifically used for the JS adaptation component 56 to invoke the JS interface of the first Hybrid in the bridge module 54 of the first Hybrid to transmit the first component data to the bridge module of the first Hybrid.

This is based on that the JS adaptation component 56 could be regarded as a JS component of the first Hybrid of the bridge module 54 of the first Hybrid, so the JS adaptation component 56 could directly invoke the JS interface of the first Hybrid of the bridge module 54 of the first Hybrid.

The first transmitting unit 541 is used for the JS layer of the bridge module 54 for the first Hybrid to transmit the first component data to the native layer.

Specifically, the first component data is transmitted from the WebView to the native layer, that is, to implement the data transmission by invoking the native layer interface of the first Hybrid.

The second transmitting unit 542 is used for the native layer to invoke the native adaptation interface of the corresponding native adaptation component 57 according to the class name and the method name of the native adaptation component 57 in the first component data to implement data transmission.

This is based on that the native adaptation component 57 could be regarded as a native component of the first Hybrid, so that the native layer could directly invoke the native adaptation interface of the native adaptation component 57.

The second receiving unit 571 is used for that the corresponding native adaptation component 57 to acquire the parameter data packet in the first component data from the bridge module 54 of the first Hybrid.

The parsing unit 572 is used for the native adaptation component 57 to parse the parameter data packet to acquire the class name and the method name of the native component 53 of the second Hybrid.

It should be understood that, parsing parameter data packet could also acquire the input parameters of the native component 53 of the second Hybrid.

The second invoking unit 573 is used for the native adaptation component 57 to invoke the interface of the corresponding native component 53 of the second Hybrid according to the class name and the method name of the native component 53 of the second Hybrid and according to a preset calling rule of the native component 53 of the second Hybrid to implement data transmission, so that the native component 53 of the second Hybrid could execute the current business.

Specifically, there may be different calling rules for the bridge modules of different Hybrids to invoke the native component, so invoking the native component 53 of the second Hybrid by the native adaptation component 57 needs to be in accordance with the calling rule of the native component 53 of the second Hybrid. For example, when the calling function is different, it needs to be invoked according to the calling function of the native component 53 of the second Hybrid. It should also be understood that, the interface of the corresponding native component 53 of the second Hybrid is invoked to send the incoming parameter of the native component 53 of the second Hybrid to the corresponding native component 53 of the second Hybrid.

Compared with the above solution, preferably, when the first receiving unit 561 acquires the second component data from the JS component 52 of the second Hybrid, the first receiving unit 561 is specifically used for the JS adaptation component 56 to acquire the second component data from the JS component 52 of the second Hybrid through the JS adaptation interface, and the JS adaptation interface simulates the JS interface of the second Hybrid, and the JS interface of the second Hybrid is intended to be used for the bridge module of the second Hybrid to acquire the second component data from the JS component 52 of the second Hybrid.

It should be noted that, this is based on that the JS interfaces exposed to the JS components by different Hybrids are different, so the above solution is preferably implemented.

Compared with the above solution, in other feasible embodiments, if the data needs to be called back after completing the current business, the post-mission callback data needs to be called back from the native component 53 of the second Hybrid to the JS component 52 of the second Hybrid. Please continually refer to FIG. 5, the JS adaptation component 56 further comprises: a first callback unit 564 and a first sending unit 565, and the native adaptation component 57 further comprises: a second callback unit 574, a second encapsulating unit 575, and a second sending unit 576.

Wherein, the second callback unit 574 is used for the native adaptation component 57 to acquire the post-mission callback data from the native component 53 of the second Hybrid.

Specifically, the callback data is the data generated after executing the business. For example, when the information on the page needs to be updated synchronously after the local completes the task, the data generated after the local completes the task needs to be returned to the JS component.

On the one hand, if a native layer callback interface exposed to the native component 53 of the second Hybrid by the second Hybrid is different from a native layer callback interface exposed to the native component of the first Hybrid by the first Hybrid, preferably, the native adaptation component 57 comprises the native adaptation callback interface, and when the second callback unit 574 acquires the post-mission callback data from the native component 53 of the second Hybrid, the second callback unit 574 is specifically used for the native adaptation component 57 to acquire the post-mission callback data from the native component 53 of the second Hybrid through the native adaptation callback interface, and the native adaptation callback interface simulates the native layer callback interface of the second Hybrid, and the native layer callback interface of the second Hybrid is intended to be used for the bridge module of the second Hybrid to acquire the callback data from the JS component 52 of the second Hybrid.

The second encapsulating unit 575 is used for the native adaptation component 57 to encapsulate the callback data as a callback data applicable for the first Hybrid according to a preset callback rule of the first Hybrid.

Specifically, based on that the data encapsulation manners of the callback data needed by the bridge modules of different Hybrids are different, therefore, the callback data of one Hybrid is not applicable for bridge module of a different Hybrid. Therefore, in the present embodiment, the callback data is encapsulated as a callback data applicable for the first Hybrid.

The second sending unit 576 is used for the native adaptation component 57 to send the callback data to the bridge module 54 of the first Hybrid.

This is based on that the native adaptation component 57 could be regarded as a native component of the first Hybrid, so the native adaptation component 57 could directly invoke the native layer callback interface of the native layer to send the callback data. Wherein, in the bridge module 54 of the first Hybrid, the callback data passes through the native layer, the Webview, and then to the JS layer.

The first sending unit 565 is used for the JS adaptation component 56 to acquire the callback data from the bridge module 54 of the first Hybrid.

This is based on that the JS adaptation component 56 could be regarded as a JS component of the first Hybrid, and the JS layer in the bridge module 54 of the first Hybrid could directly invoke the JS adaptation callback interface of the JS adaptation component 56 to transmit the callback data.

The first callback unit 564 is used for the JS adaptation component 56 to send the callback data to the JS component 52 of the second Hybrid according to the preset callback rule of the JS component 52 of the second Hybrid.

Specifically, there may be different calling rules for the bridge modules of different Hybrids to invoke the JS component, so invoking the JS component 52 of the second Hybrid by the JS adaptation component 56 needs to be in accordance with the calling rule of the JS component 52 of the second Hybrid. For example, when the calling function is different, it needs to be invoked according to the calling function of the JS component 52 of the second Hybrid.

Compared with the above solution, further preferably, when the callback data is invoked according to the instantiation object, the bridge module 54 of the first Hybrid further comprises a first instantiating unit 543.

The first instantiating unit 543 is used for the native layer to generate a first callback instance object of the native adaptation component 57 according to the first component data. Specifically, the first instantiating unit 543 generates the first callback instance object of the native adaptation component 57 according to the parameter data packet in the first component data and the class name and the method name of the native adaptation component 57, and the process of instantiating the object is: instantiating the corresponding class object according to reflection mechanism, and invoking the corresponding method name, and putting the parameter information related to the business into the parameters of the calling method.

When the second receiving unit 571 acquires the parameter data packet in the first component data from the bridge module 54 of the first Hybrid, the second receiving unit 571 is specifically used for the corresponding native adaptation component 57 to acquire the parameter data packet in the first component data and the first callback instance object from the bridge module 54 of the first Hybrid.

The second invoking unit 573 comprises: a second instantiating unit and a third transmitting unit, wherein, the second instantiating unit is used for the native adaptation component 57 to simulate to obtain a second callback instance object of the native component 53 of the second Hybrid according to the second component data; the third transmitting unit is used for the native adaptation component 57 to transmit the second callback instance object and the input parameters to the native component 53 of the second Hybrid by invoking the interface of the corresponding native component 53 of the second Hybrid according to the class name and the method name of the native component 53 of the second Hybrid and according to the preset calling rule of the native component 53 of the second Hybrid. Specifically, the second callback instance object of the native component 53 of the second Hybrid is generated according to the class name and the method name of the native component 53 of the second Hybrid in the second component data and the input parameters.

When the second callback unit 574 acquires the post-mission callback data from the native component 53 of the second Hybrid, the second callback unit 574 is specifically used for the native adaptation component 57 to acquire the callback data from the native component 53 of the second Hybrid according to the second callback instance object of the native component 53 of the second Hybrid.

Preferably, the second callback unit 574 acquires the callback data from the native component 53 of the second Hybrid according to the second callback instance object of the native component 53 of the second Hybrid and through the native adaptation callback interface. Wherein, the native adaptation callback interface simulates the native layer callback interface of the second Hybrid.

When the second encapsulating unit 575 encapsulates the callback data as the callback data applicable for the first Hybrid according to the preset callback rule of the first Hybrid, the second encapsulating unit 575 is specifically used for the native adaptation component 57 to encapsulate the callback data as the data applicable for the first callback instance object of the first Hybrid according to the preset callback rule of the first Hybrid.

Those with ordinary skill in the art could understand that all or part of the steps for implementing the above embodiments could be completed by hardware, and could also be completed by a program to instruct the relevant hardware, and the program could be stored in a computer-readable storage medium, and the above mentioned storage medium may be a read-only memory, a magnetic disk or an optical disk and so on.

The present application also provides a computer-readable storage medium, and the computer-readable storage medium stores one or more programs, and the one or more programs could be executed by one or more processors to implement the following steps: acquiring the second component data from the JS component of the second Hybrid; encapsulating the second component data as a parameter data packet applicable for the first Hybrid; transmitting the first component data to the bridge module of the first Hybrid, and the first component data comprises the parameter data packet and a pre-stored class name and method name of the native adaptation component corresponding to the JS adaptation component; transmitting the first component data to the native layer; invoking the native adaptation interface of the corresponding native adaptation component according to the class name and method name of the native adaptation component in the first component data to implement data transmission; acquiring the parameter data packet in the first component data from the bridge module of the first Hybrid; parsing the parameter data packet to acquire the class name and the method name of the native component of the second Hybrid; invoking the interface of the corresponding native component of the second Hybrid according to the class name and the method name of the native component of the second Hybrid and according to a preset calling rule of the native component of the second Hybrid to implement data transmission, so that the native component of the second Hybrid could execute the current business.

Preferably, acquiring the second component data from the JS component of the second Hybrid comprises: acquiring the second component data from the JS component of the second Hybrid through a JS adaptation interface, and the JS adaptation interface simulates the JS interface of the second Hybrid, and the JS interface of the second Hybrid is used for the bridge module of the second Hybrid to acquire the second component data from the JS component of the second Hybrid.

If the data needs to be called back after completing the current business, one or more programs could be executed by one or more processors to implement the following steps: acquiring the post-mission callback data from the native component of the second Hybrid; encapsulating the callback data as a callback data applicable for the first Hybrid according to a preset callback rule of the first Hybrid;

sending the callback data to the bridge module of the first Hybrid; acquiring the callback data from the bridge module of the first Hybrid; sending the callback data to the JS component of the second Hybrid according to the preset callback rule of the JS component of the second Hybrid.

If the callback data is invoked according to the instantiation object, preferably, one or more programs could be executed by one or more processors to implement the following step: generating a first callback instance object of the native adaptation component according to the first component data.

Preferably, the step of acquiring the parameter data packet in the first component data from the bridge module of the first Hybrid comprises: acquiring the parameter data packet in the first component data and the first callback instance object from the bridge module of the first Hybrid.

Preferably, the step of invoking the interface of the corresponding native component of the second Hybrid according to the class name and the method name of the native component of the second Hybrid and according to a preset calling rule of the native component of the second Hybrid to implement data transmission comprises: simulating to obtain a second callback instance object of the native component of the second Hybrid according to the second component data; and invoking the interface of the corresponding native component of the second Hybrid according to the class name and the method name of the native component of the second Hybrid and according to the preset calling rule of the native component of the second Hybrid, to transmit the second callback instance object and the input parameters to the native component of the second Hybrid.

Preferably, the step of acquiring the post-mission callback data from the native component of the second Hybrid comprises: acquiring the callback data from the native component of the second Hybrid according to the second callback instance object of the native component of the second Hybrid.

Preferably, the step of encapsulating the callback data as a callback data applicable for the first Hybrid according to a preset callback rule of the first Hybrid comprises: encapsulating the callback data as a data applicable for the first callback instance object of the first Hybrid according to a preset callback rule of the first Hybrid.

It should be noted that, achieving mutual compatibility of two different Hybrids requires a matching adapter, and achieving compatibility of a plurality of different Hybrids requires multiple matching adapters, and a matching adapter is needed between two Hybrids, and the embodiment of the present application will be described by taking the mutual compatibility of two different Hybrids as an example.

On the other hand, about the hardware implementation, the above first receiving unit 561, the first encapsulating unit 562, the first invoking unit 563, and the like may be embedded in or independent of an operation system based on Hybrid in a hardware form, and may also be stored in a memory of an operation system based on Hybrid in a hardware form, so that the processor could perform the operations corresponding to the above units. The processor may be a central processing unit (CPU), a microprocessor, a single chip microcomputer, or the like.

Figure 6:
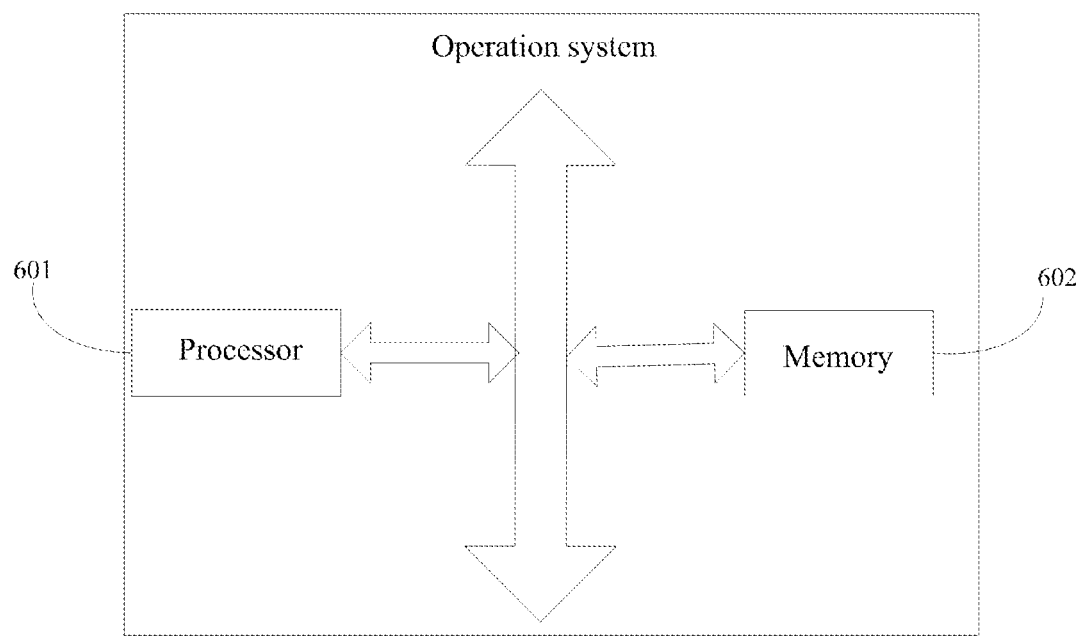
FIG. 6 is a hardware structure diagram of an operation system based on Hybrid provided by an embodiment of the present application.

In the present embodiment, the operation system based on Hybrid comprises a first Hybrid and a second Hybrid, and the first Hybrid comprises an adapter and a bridge module, ant the adapter comprises a JS adaptation component and a native adaptation component, and the bridge module of the first Hybrid is used to connect the JS adaptation component and the native adaptation component, and the JS adaptation component is used to connect a JS component of the second Hybrid and the bridge module of the first Hybrid, and the native adaptation component is used to connect the bridge module of the first Hybrid and a native component of the second Hybrid; as shown in FIG. 6, FIG. 6 is a hardware structure diagram of an operation system based on Hybrid provided by an embodiment of the present application, and the system further comprises one or more processors 601 and a memory 602, and the processor 601 and the memory 602 are connected by a bus.

Wherein, the memory 602 is used to store one or more programs for realizing the first Hybrid, the second Hybrid and the communication between the first Hybrid and the second Hybrid. In a specific implementation, the memory 602 of the embodiment of the present application may be a system memory, such as a volatile memory (such as RAM), a non-volatile memory (such as ROM, flash memory, etc.), or a combination of both. In a specific implementation, the memory 602 of the embodiment of the present application may also be an external memory outside the system, such as a magnetic disk, an optical disk, a magnetic tape, etc.

The processor 601 is used to execute the program stored in the memory 602 for realizing the first Hybrid, the second Hybrid and the communication between the first Hybrid and the second Hybrid, to perform the following operations: acquiring the second component data from the JS component of the second Hybrid; encapsulating the second component data as a parameter data packet applicable for the first Hybrid; transmitting the first component data to the bridge module of the first Hybrid, and the first component data comprises the parameter data packet and a pre-stored class name and method name of the native adaptation component corresponding to the JS adaptation component; transmitting the first component data to the native layer; invoking the native adaptation interface of the corresponding native adaptation component of the first Hybrid according to the class name and method name of the native adaptation component in the first component data to implement data transmission; acquiring the parameter data packet in the first component data from the bridge module of the first Hybrid; parsing the parameter data packet to acquire the class name and the method name of the native component of the second Hybrid; invoking the interface of the corresponding native component of the second Hybrid according to the class name and the method name of the native component of the second Hybrid and according to a preset calling rule of the native component of the second Hybrid to implement data transmission, so that the native component of the second Hybrid could execute the current business.

Preferably, the operation of acquiring the second component data from the JS component of the second Hybrid comprises: acquiring the second component data from the JS component of the second Hybrid through a JS adaptation interface, and the JS adaptation interface simulates the JS interface of the second Hybrid, and the JS interface of the second Hybrid is used for the bridge module of the second Hybrid to acquire the second component data from the JS component of the second Hybrid.

If the data needs to be called back after completing the current business, the processor could further perform the following operations: acquiring the post-mission callback data from the native component of the second Hybrid; encapsulating the callback data as a callback data applicable for the first Hybrid according to a preset callback rule of the first Hybrid; sending the callback data to the bridge module of the first Hybrid; acquiring the callback data from the bridge module of the first Hybrid; sending the callback data to the JS component of the second Hybrid according to the preset callback rule of the JS component of the second Hybrid.

If the callback data is invoked according to the instantiation object, preferably, the processor could further perform the following operation:

generating a first callback instance object of the native adaptation component according to the first component data.

Preferably, the operation of acquiring the parameter data packet in the first component data from the bridge module of the first Hybrid comprises: acquiring the parameter data packet in the first component data and the first callback instance object from the bridge module of the first Hybrid.

Preferably, the operation of invoking the interface of the corresponding native component of the second Hybrid according to the class name and the method name of the native component of the second Hybrid and according to a preset calling rule of the native component of the second Hybrid to implement data transmission comprises: simulating to obtain a second callback instance object of the native component of the second Hybrid according to the second component data; and invoking the interface of the corresponding native component of the second Hybrid according to the class name and the method name of the native component of the second Hybrid and according to the preset calling rule of the native component of the second Hybrid, to transmit the second callback instance object and the input parameters to the native component of the second Hybrid.

Preferably, the operation of acquiring the post-mission callback data from the native component of the second Hybrid comprises: acquiring the callback data from the native component of the second Hybrid according to the second callback instance object of the native component of the second Hybrid.

Preferably, the operation of encapsulating the callback data as a callback data applicable for the first Hybrid according to a preset callback rule of the first Hybrid comprises: encapsulating the callback data as a data applicable for the first callback instance object of the first Hybrid according to a preset callback rule of the first Hybrid.

It should be understood that, in the embodiment of the present application, the processor 601 may be a central processing unit (Central Processing Unit, CPU), and the processor 601 may also be other general-purpose processor, digital signal processor (Digital Signal Processor, DSP), an application specific integrated circuit (Application Specific Integrated Circuit, ASIC), a field-programmable gate array (Field-Programmable Gate Array, FPGA) or other programmable logic device, a discrete gate or transistor logic device, a discrete hardware component, and etc. A general-purpose processor may be a microprocessor or the processor may be any conventional processor and etc.

It should be noted that, the steps in the method of the embodiment of the present application could be adjusted in sequence, combined, and deleted according to actual needs.

Units in the terminal of the embodiments of the present application could be combined, divided, and deleted according to actual needs.

Person skilled in the art could clearly understand that, for the convenience and conciseness of the description, the specific working process of the terminal and the unit described above may refer to the corresponding process in the foregoing method embodiment, and details are not described herein again. In the several embodiments provided by the present application, it should be understood that, the disclosed terminal and method may be implemented by other manners. For example, the device embodiments described above are merely illustrative, for example, the division of the units is only one logical function division, and in practical implementation, there may be other division manners, for example, several units or components may be combined or could be integrated into another system, or some features could be ignored or not performed. In addition, the illustrated or discussed mutual coupling or direct coupling or communication connection may be indirect coupling or communication connection among some interfaces, devices or units, and may also be electrical, mechanical or other forms of connection.

In addition, each functional unit in each embodiment of the present application may be integrated in one processing unit, or each unit may exist alone physically, or two or more units may be integrated in one unit. The above integrated unit may be implemented either in hardware or in software. The integrated unit, if being implemented in the form of a software functional unit and sold or used as an independent product, may be stored in a computer-readable storage medium. Based on the understanding, the technical solution of the present application essentially or the part contributing to the prior art, or all or part of the technical solution could be embodied in the form of a software product, and the computer software product could be stored in a storage medium, and comprises several instructions which are used to enable a computer device (which may be a personal computer, a server, or a network device, etc.) to perform all or part of the steps of the methods described in each embodiment of the present application. The foregoing storage medium comprises various mediums that could store program codes, such as a U disk, a removable hard disk, a read-only memory (ROM, Read-Only Memory), a random access memory (RAM, Random Access Memory), a magnetic disk, or an optical disk.

The foregoing descriptions are embodiments of the present application, but the protection scope of the present application is not limited thereto, and any person skilled in the art could easily conceive various equivalent modifications and alternatives within the technical scope disclosed by the present application, and these modifications or alternatives should all fall into the protection scope of the present application. Therefore, the protection scope of the present application should be subject to the protection scope of the claims.

What is claimed is:

1. A compatibility method based on Hybrid frameworks, wherein, the method comprises:

a JS adaptation component of a first Hybrid framework acquires a second component data from a JS component of a second Hybrid framework, and the second component data comprises a class name and a method name of a native component of the second Hybrid framework for executing a current business;

the JS adaptation component encapsulates the second component data as a parameter data packet applicable for the first Hybrid framework;

the JS adaptation component transmits a first component data to a bridge module of the first Hybrid framework, and the first component data comprises the parameter data packet and a pre-stored class name and method name of the native adaptation component of the first Hybrid framework corresponding to the JS adaptation component, and the class name and the method name of the native adaptation component are used for the bridge module of the first Hybrid framework to invoke an interface of the corresponding native adaptation component for data transmission;

the corresponding native adaptation component acquires the parameter data packet in the first component data from the bridge module of the first Hybrid framework;

the native adaptation component parses the parameter data packet to acquire the class name and the method name of the native component of the second Hybrid framework;

the native adaptation component invokes an interface of the corresponding native component of the second Hybrid framework according to the class name and the method name of the native component of the second Hybrid framework and according to a preset calling rule of the native component of the second Hybrid framework to implement data transmission, so that the native component of the second Hybrid framework executes the current business;

wherein, the method further comprises:

the native adaptation component acquires a post-mission callback data from the native component of the second Hybrid framework;

the native adaptation component encapsulates the post-mission callback data as a callback data applicable for the first Hybrid framework according to a preset callback rule of the first Hybrid framework;

the native adaptation component sends the encapsulated callback data to the bridge module of the first Hybrid framework;

the JS adaptation component acquires the callback data from the bridge module of the first Hybrid framework;

the JS adaptation component sends the acquired callback data to the JS component of the second Hybrid framework according to a preset callback rule of the JS component of the second Hybrid framework.

2. The method according to claim 1, wherein, the JS adaptation component comprises a JS adaptation interface, that a JS adaptation component of a first Hybrid framework acquires a second component data from a JS component of a second Hybrid framework comprises:

the JS adaptation component acquires the second component data from the JS component of the second Hybrid framework through the JS adaptation interface, and the JS adaptation interface simulates a JS interface of the second Hybrid framework, and the JS interface of the second Hybrid framework is intended to be used for a bridge module of the second Hybrid framework to receive a calling notification of the JS component of the second Hybrid framework to acquire the second component data;

that the JS adaptation component transmits a first component data to a bridge module of the first Hybrid framework comprises:

the JS adaptation component invokes a JS interface of the first Hybrid framework to transmit the first component data to the bridge module of the first Hybrid framework.

3. The method according to claim 1, wherein, the second component data further comprises input parameters of the native component of the second Hybrid framework, that the native adaptation component invokes an interface of the corresponding native component of the second Hybrid framework according to the class name and the method name of the native component of the second Hybrid framework and according to a preset calling rule of the native component of the second Hybrid framework to implement data transmission comprises:

the native adaptation component simulates to obtain a second callback instance object of the native component of the second Hybrid framework according to the second component data;

the native adaptation component invokes the interface of the corresponding native component of the second Hybrid framework according to the class name and the method name of the native component of the second Hybrid framework and according to the preset calling rule of the native component of the second Hybrid framework to transmit the second callback instance object and the input parameters to the native component of the second Hybrid framework;

that the native adaptation component acquires a post-mission callback data from the native component of the second Hybrid framework specifically comprises:

the native adaptation component acquires the callback data from the native component of the second Hybrid framework according to the second callback instance object.

4. An adapter, wherein, the adapter is disposed in a first Hybrid framework, for making a second Hybrid framework compatible with the first Hybrid framework, and the adapter comprises a JS adaptation component and a native adaptation component, and the JS adaptation component comprises a first receiving unit, a first encapsulating unit and a first invoking unit, and the native adaptation component comprises a second receiving unit, a parsing unit, and a second invoking unit, the first receiving unit is used for acquiring a second component data from a JS component of the second Hybrid framework, and the second component data comprises a class name and a method name of a native component of the second Hybrid framework for executing a current business;

the first encapsulating unit is used for encapsulating the second component data as a parameter data packet applicable for the first Hybrid framework;

the first invoking unit is used for transmitting a first component data to a bridge module of the first Hybrid framework, and the first component data comprises the parameter data packet and a pre-stored class name and method name of the native adaptation component of the first Hybrid framework corresponding to the JS adaptation component, and the class name and the method name of the native adaptation component are used for the bridge module of the first Hybrid framework to invoke an interface of the corresponding native adaptation component for data transmission;

the second receiving unit is used for the corresponding native adaptation component to acquire the parameter data packet in the first component data from the bridge module of the first Hybrid framework;

the parsing unit is used for parsing the parameter data packet to acquire the class name and the method name of the native component of the second Hybrid framework;

the second invoking unit is used for invoking an interface of the corresponding native component of the second Hybrid framework according to the class name and the method name of the native component of the second Hybrid framework and according to a preset calling rule of the native component of the second Hybrid framework to implement data transmission, so that the native component of the second Hybrid framework executes the current business;

wherein, the JS adaptation component further comprises a first callback unit and a first sending unit; and the native adaptation component comprises a second callback unit, a second encapsulating unit, and a second sending unit, the second callback unit is used for acquiring a post-mission callback data from the native component of the second Hybrid framework;

the second encapsulating unit is used for encapsulating the post-mission callback data as a callback data applicable for the first Hybrid framework according to a preset callback rule of the first Hybrid framework;

the second sending unit is used for sending the encapsulated callback data to the bridge module of the first Hybrid framework;

the first sending unit is used for acquiring the callback data from the bridge module of the first Hybrid framework;

the first callback unit is used for the JS adaptation component to send the acquired callback data to the JS component of the second Hybrid framework according to a preset callback rule of the JS component of the second Hybrid framework.

5. The adapter according to claim 4, wherein, the JS adaptation component comprises a JS adaptation interface, when the first receiving unit acquires the second component data, the first receiving unit acquire the second component data from the JS component of the second Hybrid framework through the JS adaptation interface, and the JS adaptation interface simulates the JS interface of the second Hybrid framework, and the JS interface of the second Hybrid framework is intended to be used for the bridge module of the second Hybrid framework to receive the calling notification of the JS component of the second Hybrid framework to acquire the second component data;

when the first invoking unit transmits the first component data to the bridge module of the first Hybrid framework, the first invoking unit invokes a JS interface of the first Hybrid framework to transmit the first component data to the bridge module of the first Hybrid framework.

6. The adapter according to claim 4, wherein, the second component data further comprises input parameters of the native component of the second Hybrid framework, and the second invoking unit comprises a second instantiating unit and a third transmitting unit, the second instantiating unit is used for the native adaptation component to simulate to obtain a second callback instance object of the native component of the second Hybrid framework according to the second component data;

the third transmitting unit is used for the native adaptation component to invoke the interface of the corresponding native component of the second Hybrid framework according to the class name and the method name of the native component of the second Hybrid framework and according to the preset calling rule of the native component of the second Hybrid framework to transmit the second callback instance object and the input parameters to the native component of the second Hybrid framework;

when the second callback unit acquires the post-mission callback data, the second callback unit is used for the native adaptation component to acquire the post-mission callback data from the native component of the second Hybrid framework according to the second callback instance object.

7. An operation system based on Hybrid frameworks, wherein, the operation system comprises a first Hybrid framework and a second Hybrid framework, and the first Hybrid framework comprises an adapter and a bridge module, ant the adapter comprises a JS adaptation component and a native adaptation component, and the bridge module of the first Hybrid framework is used to connect the JS adaptation component and the native adaptation component, and the JS adaptation component is used to connect a JS component of the second Hybrid framework and the bridge module of the first Hybrid framework, and the native adaptation component is used to connect the bridge module of the first Hybrid framework and a native component of the second Hybrid framework, and the system further comprises one or more processors and a memory, and the processor and the memory are connected by a bus;

wherein, the memory is used to store a program for realizing the first Hybrid framework, the second Hybrid framework and a communication between the first Hybrid framework and the second Hybrid framework;

the processor is used to execute the program stored in the memory for realizing the first Hybrid framework, the second Hybrid framework and the communication between the first Hybrid framework and the second Hybrid framework, to perform the following operations:

acquiring a second component data from a JS component of a second Hybrid framework;

encapsulating the second component data as a parameter data packet applicable for a first Hybrid framework;

transmitting a first component data to a bridge module of the first Hybrid framework, and the first component data comprises the parameter data packet and a pre-stored class name and method name of a native adaptation component corresponding to a JS adaptation component;

transmitting the first component data to a native layer;

invoking a native adaptation interface of the corresponding native adaptation component of the first Hybrid framework according to the class name and method name of the native adaptation component in the first component data to implement data transmission;

acquiring the parameter data packet in the first component data from the bridge module of the first Hybrid framework;

parsing the parameter data packet to acquire a class name and a method name of a native component of the second Hybrid framework;

invoking an interface of the corresponding native component of the second Hybrid framework according to the class name and the method name of the native component of the second Hybrid framework and according to a preset calling rule of the native component of the second Hybrid framework to implement data transmission, so that the native component of the second Hybrid framework executes the current business;

wherein, if a data needs to be called back after executing the current business, the processor further performs the following operations:

acquiring a post-mission callback data from the native component of the second Hybrid framework;

encapsulating the post-mission callback data as a callback data applicable for the first Hybrid framework according to a preset callback rule of the first Hybrid framework;

sending the callback data to the bridge module of the first Hybrid framework;

acquiring the callback data from the bridge module of the first Hybrid framework;

sending the acquired callback data to the JS component of the second Hybrid framework according to the preset callback rule of the JS component of the second Hybrid framework.

8. The operation system based on Hybrid frameworks according to claim 7, wherein, acquiring a second component data from a JS component of a second Hybrid framework comprises:

acquiring the second component data from the JS component of the second Hybrid framework through a JS adaptation interface, and the JS adaptation interface simulates a JS interface of the second Hybrid framework, and the JS interface of the second Hybrid framework is used for a bridge module of the second Hybrid framework to acquire the second component data from the JS component of the second Hybrid framework.

9. The operation system based on Hybrid frameworks according to claim 7, wherein, if the post-mission callback data is invoked according to an instantiation object, the processor further performs the following operation:

generating a first callback instance object of the native adaptation component according to the first component data.

10. The operation system based on Hybrid frameworks according to claim 7, wherein, acquiring the parameter data packet in the first component data from the bridge module of the first Hybrid framework comprises:

acquiring the parameter data packet in the first component data and a first callback instance object from the bridge module of the first Hybrid framework.

11. The operation system based on Hybrid frameworks according to claim 7, wherein, invoking an interface of the corresponding native component of the second Hybrid framework according to the class name and the method name of the native component of the second Hybrid framework and according to a preset calling rule of the native component of the second Hybrid framework to implement data transmission comprises:

simulating to obtain a second callback instance object of the native component of the second Hybrid framework according to the second component data;

and invoking the interface of the corresponding native component of the second Hybrid framework according to the class name and the method name of the native component of the second Hybrid framework and according to the preset calling rule of the native component of the second Hybrid framework, to transmit the second callback instance object and the input parameters to the native component of the second Hybrid framework.

12. The operation system based on Hybrid frameworks according to claim 7, wherein, acquiring a post-mission callback data from the native component of the second Hybrid framework comprises:

acquiring the post-mission callback data from the native component of the second Hybrid framework according to a second callback instance object of the native component of the second Hybrid framework.

13. The operation system based on Hybrid frameworks according to claim 7, wherein, encapsulating the post-mission callback data as a callback data applicable for the first Hybrid framework according to a preset callback rule of the first Hybrid framework comprises:

encapsulating the post-mission callback data as a data applicable for a first callback instance object of the first Hybrid framework according to the preset callback rule of the first Hybrid framework.

* * * * *